United States Patent
Fujimoto (10) Patent No.: US 9,678,633 B2
(45) Date of Patent: Jun. 13, 2017

(54) DISPLAY DEVICE, IMAGE FORMING APPARATUS, AND DISPLAY CONTROL METHOD

(71) Applicant: KYOCERA Document Solutions Inc., Osaka (JP)

(72) Inventor: Norie Fujimoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/769,909

(22) PCT Filed: Sep. 17, 2014

(86) PCT No.: PCT/JP2014/074526
§ 371 (c)(1),
(2) Date: Aug. 24, 2015

(87) PCT Pub. No.: WO2015/064235
PCT Pub. Date: May 7, 2015

(65) Prior Publication Data
US 2016/0011728 A1    Jan. 14, 2016

(30) Foreign Application Priority Data
Oct. 29, 2013   (JP) ................................ 2013-224289

(51) Int. Cl.
*G06F 3/0483* (2013.01)
*G06F 3/0488* (2013.01)
*G06F 3/041* (2006.01)

(52) U.S. Cl.
CPC ............ *G06F 3/0483* (2013.01); *G06F 3/041* (2013.01); *G06F 3/0488* (2013.01); *G06F 3/04883* (2013.01)

(58) Field of Classification Search
CPC .. G06F 3/0483; G06F 3/0488; G06F 3/04883; G06F 3/03547; G06F 3/041;
(Continued)

(56) References Cited

U.S. PATENT DOCUMENTS 5,463,725 A * 10/1995 Henckel ................ G06F 3/0483
                                                          345/473
9,400,601 B2 *  7/2016 Tecarro ................. G06F 3/0483
(Continued)

FOREIGN PATENT DOCUMENTS

JP       2011-170603 A    9/2011
JP       2013-196312 A    9/2013

OTHER PUBLICATIONS

International Search Report for PCT/JP2014/074526 dated Nov. 18, 2014.

*Primary Examiner* — Sanjiv D Patel
(74) *Attorney, Agent, or Firm* — Studebaker & Brackett PC (57) ABSTRACT

A display device (10) includes a display section (210), a detection section (220), and a display control section (100). The display section (210) displays a plurality of pages (P). The detection section (220) detects a plurality of touch points on a display surface of the display section (210). The display control section (100) performs page turning of the plurality of pages in response to movement of one of the touch points and suspends page turning in response to movement of the touch point stopping. In response to movement of a touch point different from the touch point that stops among the plurality of touch points, the display control section (100) performs page turning at a page turning speed different from that in page turning before the touch point stops. The turning speed is the number of pages (P) turned per unit time.

8 Claims, 6 Drawing Sheets

(58) Field of Classification Search
CPC ............... G06F 3/04847; G06F 1/1652; G06F 2203/04104; G06F 3/0485; G06F 2203/04106; G06F 2203/04808; G06F 3/04886
See application file for complete search history.

(56) References Cited

U.S. PATENT DOCUMENTS

| | | | | |
|---|---|---|---|---|
| 2003/0020687 | A1* | 1/2003 | Sowden | G06F 3/03547 345/157 |
| 2010/0134425 | A1* | 6/2010 | Storrusten | G06F 3/0425 345/173 |
| 2010/0275150 | A1* | 10/2010 | Chiba | G06F 3/0488 715/784 |
| 2012/0069056 | A1* | 3/2012 | Ito | G06F 3/0483 345/684 |
| 2012/0084705 | A1* | 4/2012 | Lee | G06F 3/0483 715/776 |
| 2012/0098836 | A1* | 4/2012 | Kim | G06F 3/0483 345/473 |
| 2013/0063384 | A1* | 3/2013 | Ito | G01C 21/3664 345/173 |
| 2013/0232439 | A1* | 9/2013 | Lee | G06F 3/0488 715/776 |
| 2013/0268847 | A1* | 10/2013 | Kim | G06F 3/0488 715/251 |
| 2014/0098023 | A1* | 4/2014 | Zhai | G06F 3/0237 345/168 |
| 2014/0223381 | A1* | 8/2014 | Huang | G06F 17/30905 715/863 |
| 2014/0362016 | A1* | 12/2014 | Matsuki | G06F 3/041 345/173 |
| 2015/0242074 | A1* | 8/2015 | Iwamoto | G06F 3/0483 345/158 |

\* cited by examiner

DISPLAY DEVICE, IMAGE FORMING APPARATUS, AND DISPLAY CONTROL METHOD

TECHNICAL FIELD

The present invention relates to display devices that display a plurality of pages, image forming apparatuses, and display control methods.

BACKGROUND ART

Patent Literature 1 discloses a mobile terminal with a touch panel that displays an image file (page). Upon detecting a flick operation using one finger, the touch panel displays an image file that is moved by one file. By contrast, upon detecting a flick operation using three fingers, the touch panel displays an image file that is moved by three files.

CITATION LIST

Patent Literature

[Patent Literature 1]
Japanese Patent Application Laid-Open Publication No. 2011-170603

SUMMARY OF INVENTION

Technical Problem

However, in a situation in which a user does not know how many files a target image file is located before or after a currently displayed image file, the user causes display of an image file at random in the mobile terminal recited in Patent Literature 1. Therefore, searching for a target image file is burdensome. Further, the number of image files that can be moved is limited to the number of fingers, that is, five. In order to move six or more files, a user is accordingly required to repeat the operation, thereby further increasing a burden of searching for a target image file.

The present invention has been made in view of the aforementioned problems and has an objective of providing a display device, an image forming apparatus, and a display control method that can reduce a burden for searching for a target page among a plurality of pages.

Solution to Problem

A display device according to a first aspect of the present invention includes a display section, a detection section, and a display control section. The display section displays a plurality of pages. The detection section detects a plurality of touch points on a display surface of the display section. The display control section performs page turning of the plurality of pages in response to movement of one of the plurality of touch points and suspends page turning in response to movement of the touch point stopping. In response to movement of a touch point different from the touch point that stops among the plurality of touch points, the display control section performs page turning at a page turning speed different from that in page turning before the touch point stops. The turning speed is the number of pages turned per unit time.

An image forming apparatus according to a second aspect of the present invention includes the display device according to the first aspect of the present invention and an image forming section. The image forming section forms an image on paper of a page selected from the plurality of pages.

A display control method according to a third aspect of the present invention includes: displaying a plurality of pages; detecting a plurality of touch points on a display surface of a display section; performing page turning of the plurality of pages in response to movement of one of the plurality of touch points; suspending page turning in response to movement of the touch point stopping; and in response to movement of a touch point different from the touch point that stops among the plurality of touch points, performing page turning at a page turning speed different from that in page turning before the touch point stops.

Advantageous Effects of Invention

According to the present invention, pages are turned in response to movement of a touch point. Upon a touch point moving that is different from a stopping touch point, the page turning speed is changed. Accordingly, a user can turn pages by moving a finger on a display surface and change the page turning speed by using a different finger on the display surface. As a result, the user can readily search for a target page through an easy operation.

DESCRIPTION OF EMBODIMENTS

Hereinafter, embodiments of the present invention will be described with reference to the accompanying drawings. Note that like numerals denote like elements or corresponding elements in the drawings, and repeated description shall be omitted.

(First Embodiment)

[Basic Principle]

Figure 1:
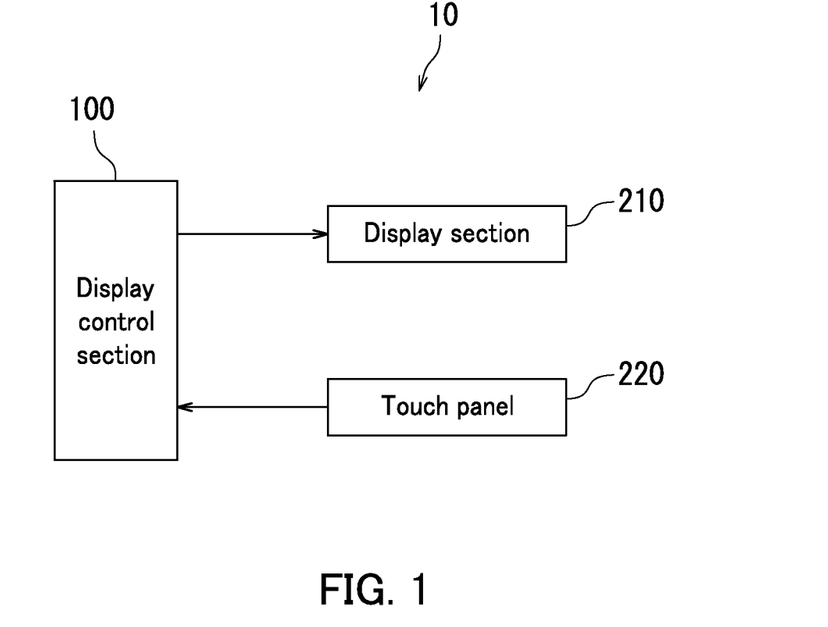
FIG. 1 is a block diagram illustrating a display device according to a first embodiment of the present invention.
Figure 2A:
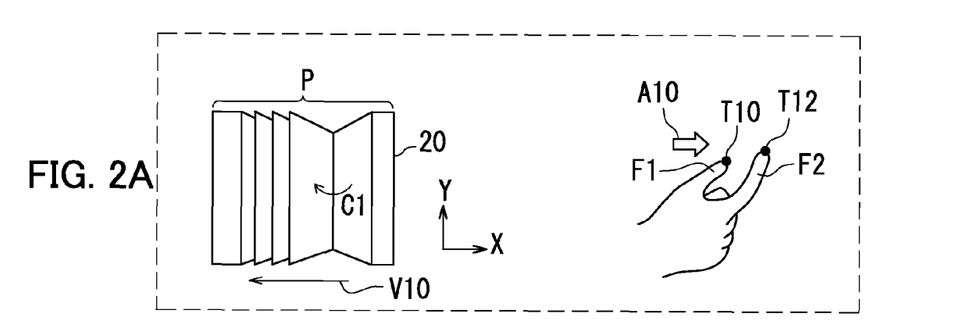
FIG. 2A is a diagram illustrating page turning performed by the display device and an operation process in the display device according to the first embodiment of the present invention.
Figure 2B:
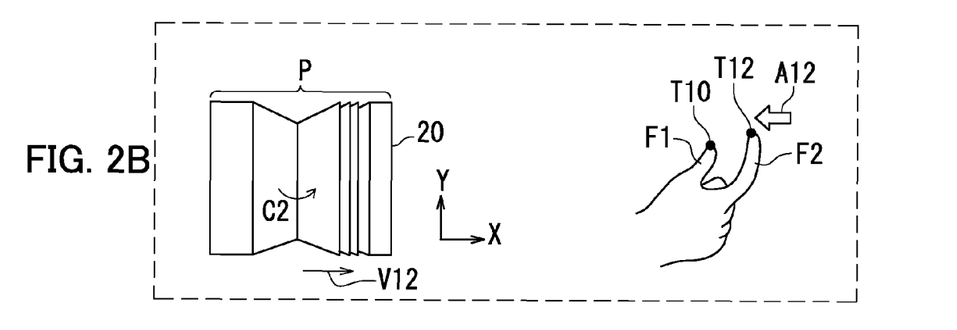
FIG. 2B is a diagram illustrating page turning performed by the display device and the operation process in the display device according to the first embodiment of the present invention.

A basic principle of a display device 10 according to a first embodiment of the present invention will be described with reference to FIGS. 1, 2A, and 2B. FIG. 1 is a block diagram illustrating the display device 10. FIGS. 2A and 2B are diagrams each illustrating page turning performed by the display device 10 and the essence of an operation process in the display device 10. The display device 10 includes a display control section 100, a display section 210, and a touch panel 220 that is a detection section.

The display section 210 displays a plurality of pages P of an e-book, a set of images, or the like. The touch panel 220 detects touch points T10 and T12 (a plurality of touch points) on a display surface of the display section 210. The display control section 100 performs page turning of the plurality of pages P (see an arrow C1) in response to movement (see an arrow A10) of either one of the touch points T10 and T12 (the touch point T10 in FIG. 2A). The display control section 100 suspends page turning in response to movement of the touch point T10 stopping.

Upon movement of the touch point T12 that is different from the stopping touch point T10 of the touch points T10 and T12 (see an arrow A12), the display control section 100 performs page turning at a page turning speed V12 different from a page turning speed V10 before the touch point T10 stops. The page turning speeds V10 and V12 are the number of pages P turned per unit time. For example, the different page turning speed V12 is preferably lower than the page turning speed V10 before the touch point T10 stops. However, the different page turning speed V12 may be higher than the page turning speed V10 before the touch point T10 stops.

According to the first embodiment, pages P are turned in response to movement of the touch point T10, or T12, and the page turning speed V10 is changed to the page turning speed V12 upon the moving touch point T12 that is different from the stopping touch point T10. In the above configuration, a user can turn pages P by moving a finger on the display surface of the display section 210 and change the page turning speed by changing the finger used on the display surface of the display section 210. As a result, the user can readily search for a target page P through an easy operation.

[Brief Description of Reading Mode and Search Mode]

A reading mode and a search mode will be described with reference to FIGS. 1 and 3A-3E. FIGS. 3A-3E are diagrams each illustrating page turning performed by the display device 10 and an operation process in the display device 10. An e-book 20 containing a plurality of pages P will be described below as an example in the first embodiment. Note that each of the pages P contains information. The information may be a character, numeral, symbol, figure, picture, photograph, text, or image, for example.

Figure 3A:
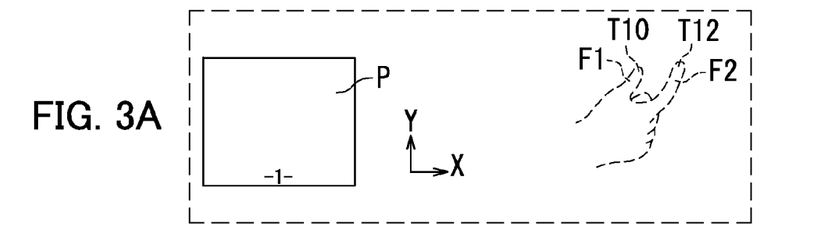
FIG. 3A is a diagram illustrating page turning performed by the display device and an operation process in the display device according to the first embodiment of the present invention.

The display control section 100 has the reading mode and the search mode. For example, when one e-book 20 is selected from a plurality of e-books, the front page or the first page P of the selected e-book 20 is displayed in the reading mode that is set initially. As illustrated in FIGS. 3A and 3E, the display section 210 displays a page P selected from the plurality of pages P in parallel to the display surface (displays the page P in a parallel state) in the reading mode. A user accordingly can easily read or view information contained in the page P.

Figure 3B:
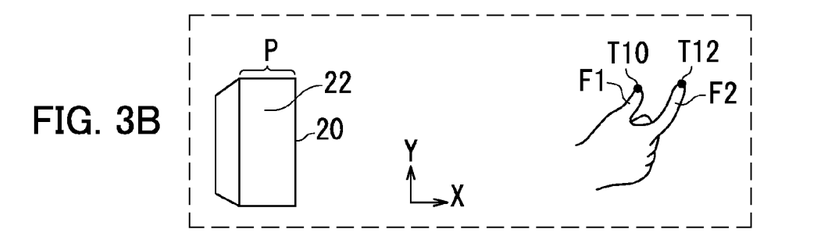
FIG. 3B is a diagram illustrating page turning performed by the display device and the operation process in the display device according to the first embodiment of the present invention.
Figure 3C:
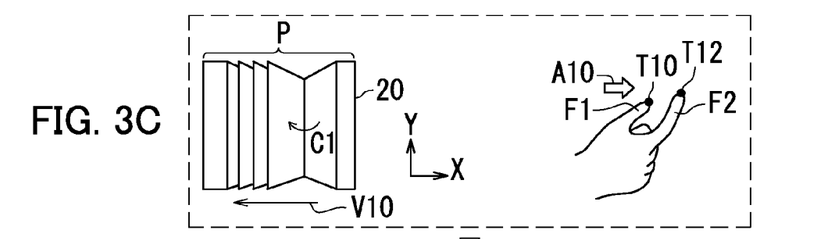
FIG. 3C is a diagram illustrating page turning performed by the display device and the operation process in the display device according to the first embodiment of the present invention.
Figure 3D:
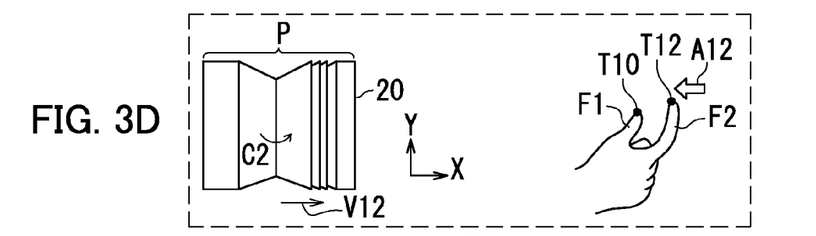
FIG. 3D is a diagram illustrating page turning performed by the display device and the operation process in the display device according to the first embodiment of the present invention.
Figure 3E:
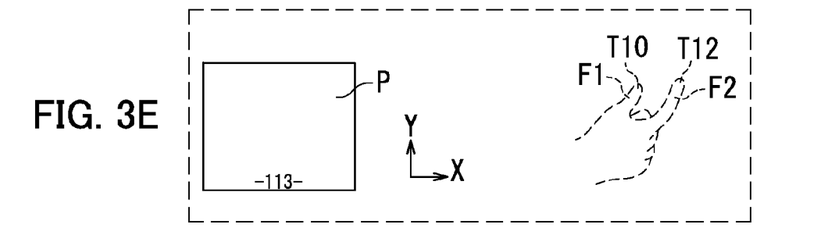
FIG. 3E is a diagram illustrating page turning performed by the display device and the operation process in the display device according to the first embodiment of the present invention.

By contrast, as illustrated in FIGS. 3B-3D, the display section 210 displays the plurality of pages P, that is, the e-book 20 upright in the search mode. As illustrated in FIGS. 3C and 3D, the display control section 100 performs control for page turning in the search mode.

In the search mode, the e-book 20 is displayed upright, so that turned pages P are displayed at an angle (displays the pages P in a slanting state). The user can turn pages P for searching for a target page P while viewing the information contained in each of the pages P.

[Details of Reading Mode and Search Mode]

The reading mode and the search mode will be described in detail with reference to FIGS. 2A-3E. Prior to detailed description, an XY coordinate system presented in FIGS. 2A-3E will be explained. The X axis is parallel to a long side of the display surface of the display section 210, while the Y axis is in parallel to a short side of the display surface of the display section 210. A touch point is expressed by a position coordinate (X, Y). In the first embodiment, a movement amount of a touch point is a magnitude of an X component in a movement vector of the touch point. In the first embodiment, a movement direction of a touch point is an orientation of the X component in a movement vector of the touch point. A user operates the touch panel 220 using a right thumb F1 and a right forefinger F2. The touch panel 220 accordingly detects two touch points.

As illustrated in FIG. 3A, the reading mode is set initially. In the initially set reading mode, a page P corresponding to the first page is selected from the plurality of pages P. This selection is performed by the display control section 100. In response, the display section 210 displays the selected page P. The page P is displayed in parallel to the display surface. The user is not touching the touch panel 220 yet. The touch panel 220 accordingly detects no touch point.

The user touches the touch panel 220 using the right thumb F1 and the right forefinger F2. The touch panel 220 accordingly detects a touch point T10 corresponding to the thumb F1 and a touch point T12 corresponding to the forefinger F2 in the reading mode. Upon the touch panel 220 detecting the two touch points T10 and T12 in the reading mode, the display control section 100 changes mode from the reading mode to the search mode.

As illustrated in FIG. 3B, in response to mode change to the search mode, the display section 210 displays the e-book 20 upright. After transition from the initially set reading mode to the search mode, the e-book 20 is displayed in a closed state. In other words, a fore edge 22 is displayed, and information contained in each of the pages is not displayed.

The display control section 100 performs control for page turning according to whichever of the touch points T10 and T12 moves earlier. An example is presented in which the touch point T10 moves earlier than the touch point T12. As illustrated in FIG. 3C, the user slides the thumb F1 in a direction indicated by an arrow A10 while keeping the forefinger F2 still. The touch panel 220 accordingly detects movement of the touch point T10 corresponding to the thumb F1.

The display control section 100 performs page turning at a page turning speed V10 in a page turning direction (a direction indicated by an arrow C1) according to a movement direction (a direction indicated by the arrow A10) of the touch point T10 that the touch panel 220 detects in the search mode. In this case, the display control section 100 continues page turning during the movement of the touch point T10. The page turning direction is opposite to the movement direction of the touch point T10. For example, the page turning direction (the direction indicated by the arrow C1) is directed toward the last page P of the plurality of pages P. In the search mode, turned pages P are displayed at an angle relative to the display surface.

The display control section 100 performs control for page turning in response to movement of the other of the touch points T10 and T12 that moves after stopping of the one touch point that moves earlier. An example is presented next in which the touch point T12 moves after stopping of the touch point T10.

The user keeps the thumb F1 still. The touch panel 220 accordingly detects stopping of the touch point T10 corresponding to the thumb F1. Upon the touch panel 220 detecting the stopping touch point T10, the display control section 100 suspends page turning.

As illustrated in FIG. 3D, the user then slides the forefinger F2 in the direction indicated by the arrow A12 while keeping the thumb F1 still. The touch panel 220 accordingly detects movement of the touch point T12 corresponding to the forefinger F2.

The display control section 100 performs page turning at a page turning speed V12 in a page turning direction (a direction indicated by an arrow C2) according to the movement direction of the touch point T12 (the direction indicated by the arrow A12) that the touch panel 220 detects in the search mode. In this case, the display control section 100 continues page turning during the movement of the touch point T12. The page turning speed V12 is lower than the page turning speed V10 corresponding to the movement of the touch point T10. The page turning direction is opposite to the movement direction of the touch point T12. For example, the page turning direction (the direction indicated by the arrow C2) is directed toward the top page P of the plurality of pages P. In the search mode, turned pages P are displayed at an angle relative to the display surface.

In the first embodiment, the page turning speed V10 corresponding to the touch point T10 of the touch points T10 and T12 that moves earlier is set higher than the page turning speed V12 corresponding to the touch point T12 that moves later.

When finding a target page P, the user removes the thumb F1 and the forefinger F2 from the touch panel 220. In other words, the user removes the user's hand from the touch panel 220. In the above situation, the touch panel 220 detects transition from a state in which the touch points T10 and T12 are detected to a state in which the touch points T10 and T12 are not detected in the search mode.

Upon the touch panel 220 detecting transition from the state in which the two touch points T10 and T12 (a plurality of touch points) are detected to the state in which the touch points T10 and T12 (a plurality of touch points) are not detected in the search mode, the display control section 100 changes the mode from the search mode to the reading mode.

As illustrated in FIG. 3E, after changing from the search mode, a page P opened when page turning is suspended is selected from the plurality of pages P in the reading mode. This selection is done by the display control section 100. The display section 210 then displays the selected page P. The page P is displayed in parallel to the display surface.

[Display Control Method]

Figure 4:
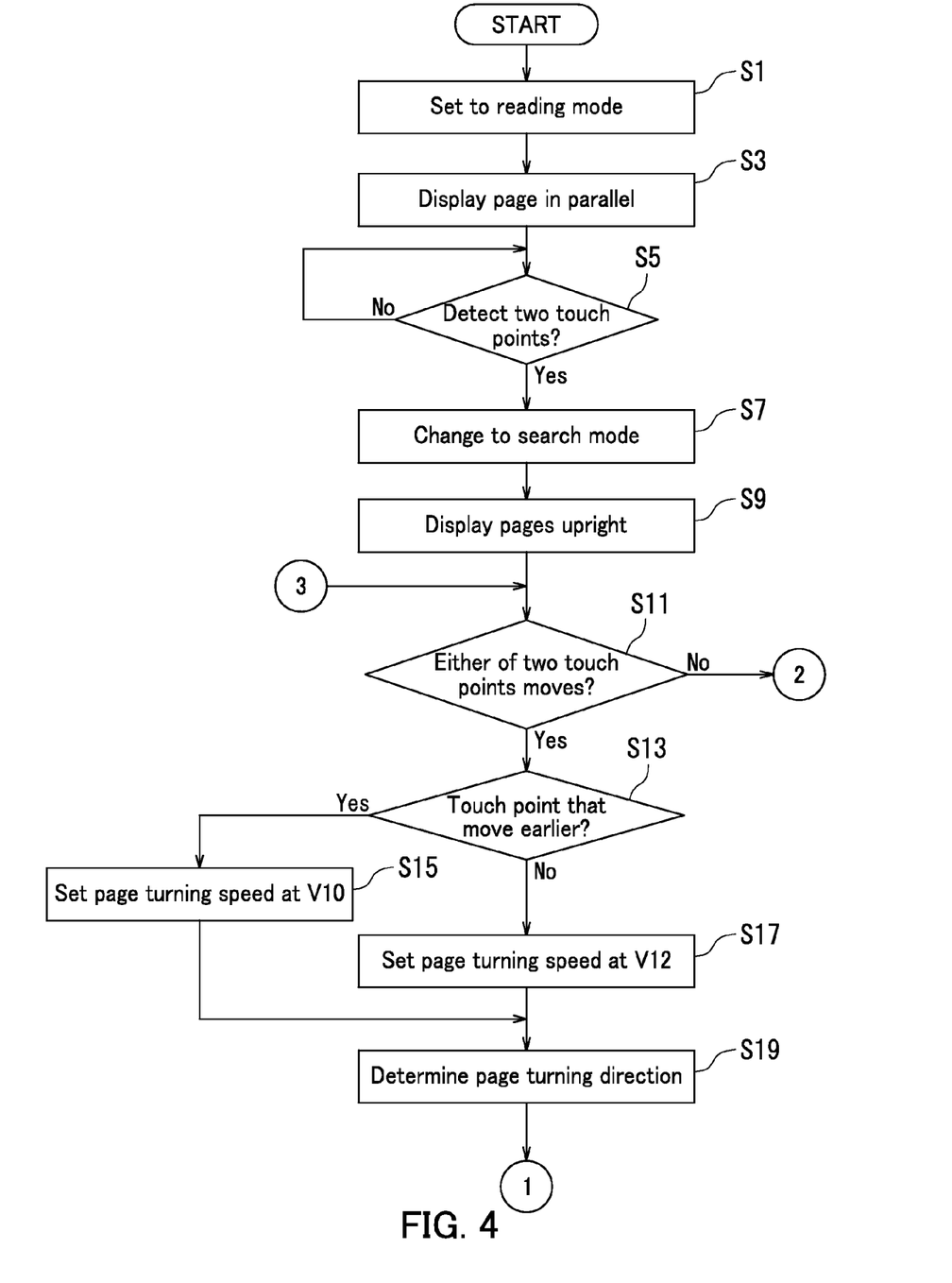
FIG. 4 is a flowchart depicting an initial part of a display control method that the display device performs according to the first embodiment of the present invention.
Figure 5:
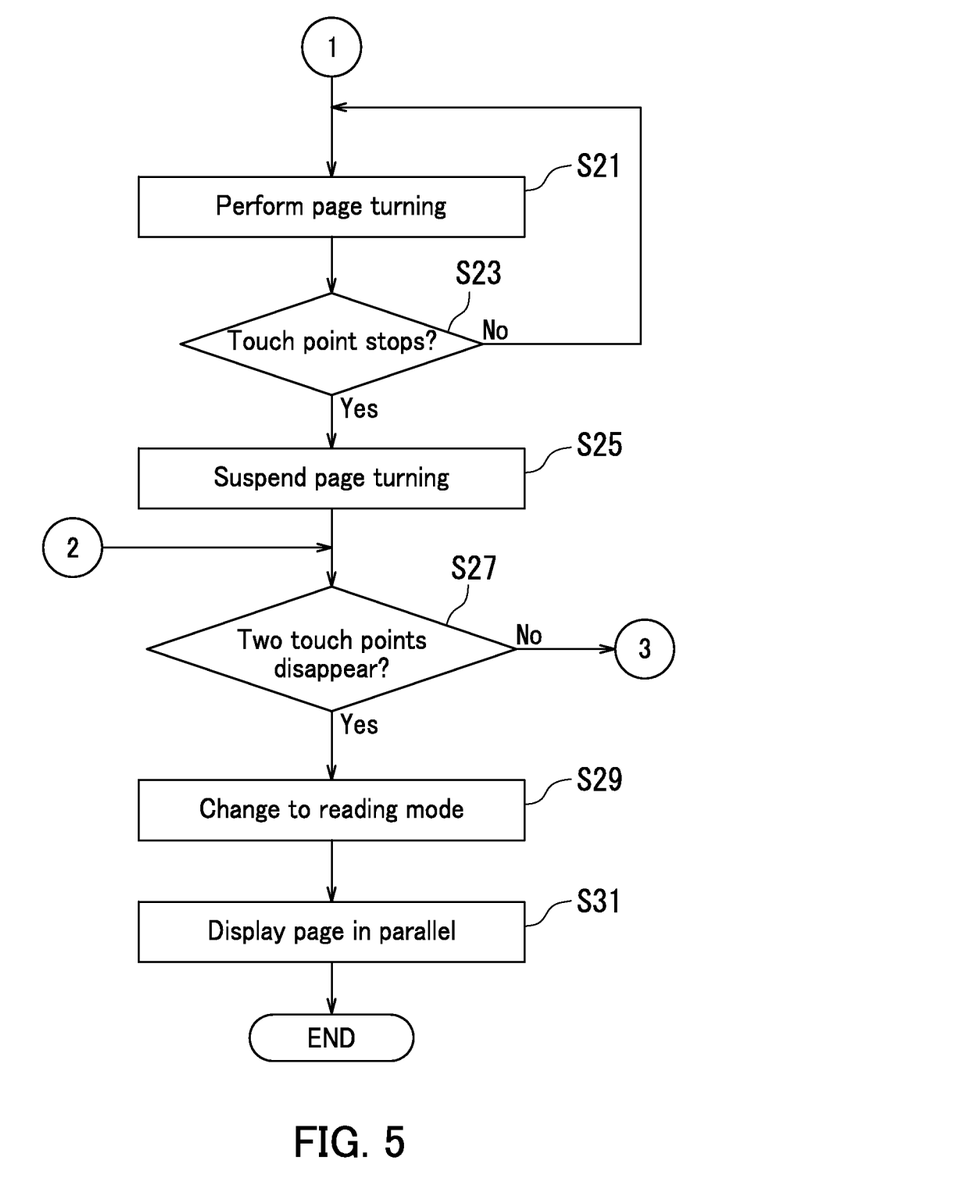
FIG. 5 is a flowchart depicting a latter part of the display control method that the display device performs according to the first embodiment of the present invention.

A display control method that the display device 10 performs will be described with reference to FIGS. 1-5. FIGS. 4 and 5 are flowcharts depicting the display control method.

At Step S1, the display control section 100 sets the mode to the reading mode. At Step S3, under control of the display control section 100, the display section 210 displays a page P selected from the plurality of pages P in parallel to the display surface. For example, the selected page P is the first page.

At Step S5, the display control section 100 determines whether or not the touch panel 220 detects two touch points T10 and T12. When a negative determination is made (No) at Step S5, the routine repeats Step S5. When a positive determination is made (Yes) at Step S5, the routine proceeds to Step S7. In this situation, the touch panel 220 detects the two touch points T10 and T12.

At Step S7, the display control section 100 changes the mode from the reading mode to the search mode. At Step S9, the display section 210 displays a plurality of pages P under control of the display control section 100. Specifically, the display section 210 displays a plurality of pages P upright.

At Step S11, the display control section 100 determines whether or not the touch panel 220 detects movement of either one of the touch points T10 and T12. When a positive determination is made (Yes) at Step S11, the routine proceeds to Step S13. When a negative determination is made (No) at Step S11, the routine proceeds to Step S27 in FIG. 5. Step S27 will be described later.

At Step S13, the display control section 100 determines whether or not the touch point determined as the one touch point that moves at Step S11 is an earliest of the touch points to move. When a positive determination is made (Yes) at Step S13, the routine proceeds to Step S15. At Step S15, the display control section 100 sets a speed of page turning to be a page turning speed V10.

By contrast, when a negative determination is made (No) at Step S13, the routine proceeds to Step S17. At Step S17, the display control section 100 sets a speed of page turning to be a page turning speed V12. The page turning speed V12 is lower than the page turning speed V10.

At Step S19, the display control section 100 determines a page tuning direction according to a movement direction of the touch point. The routine then proceeds to Step S21 in FIG. 5. Description of the display control method will be continued with reference to FIG. 5.

At Step S21, the display control section 100 performs page turning in the turning direction determined at Step S19 in FIG. 4 at the page turning speed V10 set at Step S15 in FIG. 4 or the page turning speed V12 set at Step S17 in FIG. 4. In other words, the display control section 100 performs page turning in response to the movement of either one of the two touch points T10 and T12.

At Step S23, the display control section 100 determines whether or not the touch point stops. When a negative determination is made (No) at Step S23, the routine proceeds to Step S21. During the movement of the touch point, pages P are turned in response. By contrast, when a positive determination is made (Yes) at Step S23, the routine proceeds to Step S25. At Step S25, the display control section 100 suspends page turning. Specifically, the display control section 100 suspends page turning in response to the movement of the touch point stopping.

Note that in response to movement of the touch point, among the touch points T10 and T12, that is different from the stopping touch point (No at Step S13 in FIG. 14), the display control section 100 performs page turning at the page turning speed V12 different from the page turning speed V10 before the touch point stops (Steps S17 and S21 in FIG. 4).

At Step S27, the display control section 100 determines whether or not the touch points T10 and T12 disappear, that is, whether or not the touch panel 220 detects transition from a state in which the two touch points T10 and T12 are detected to a state in which the touch points T10 and T12 are not detected. When a negative determination is made (No) at Step S27, the routine proceeds to Step S11 in FIG. 4. When a positive determination is made (Yes) at Step S27, the routine proceeds to Step S29.

At Step S29, the display control section 100 changes the mode from the search mode to the reading mode. At Step S31, the display section 210 displays a page P selected from the plurality of pages P in parallel to the display surface under control of the display control section 100. The selected page P is a page P opened when page turning of the pages P is suspended.

In the first embodiment, pages P are turned in response to movement of the touch point T10 or T12, as described above with reference to FIGS. 1-5. The page turning speed is lower when the touch point T12, which is different from the touch point T10 that moves earlier, moves (speed V10>speed V12). In the above configuration, the user can search for pages around a target page P at a higher page turning speed by moving the thumb F1 on the display surface (execution of rough search) and specify the target page P at low page turning speed (execution of pinpoint search). As a result, the target page P can be found efficiently.

Further, in the first embodiment, in response to movement of the touch point T12, which differs from the touch point T10 that moves earlier and stops, the display control section 100 performs page turning in a direction different from the page turning direction before the touch point T10 stops (see FIGS. 3C and 3D). In the above configuration, the user can turn pages P by moving a finger on the display surface and change the turning direction by changing the finger used on the display surface. As a result, the user can readily search for a target page through an easy operation.

Moreover, in the first embodiment, the mode is changed to the search mode upon detection of the touch points T10 and T12 in the reading mode (see FIGS. 3A and 3B). In the above configuration, the mode can be changed to the search mode simply by the user touching the display surface of the display section 210 using a plurality of fingers. The user can turn pages P by moving a finger in touch with the display surface of the display section 210. As a result, the user can easily change a state of page reading or viewing to a state of page search.

Further, in the first embodiment, the mode is changed to the reading mode upon disappearance of the touch points T10 and T12 in the search mode (see FIG. 3D and 3E). In the above configuration, the user can suspend page turning by simply removing the plurality of fingers (non-touch) from the display surface of the display section 210 once finding the target page P, and change the slanting state to the parallel state of the page P. As a result, a user's simple operation can cause the page P to be displayed in an easily readable or viewable state.

In addition, in the first embodiment, page turning is controlled through the two touch points T10 and T12. In the above configuration, the user can control page turning using two fingers.

(Second Embodiment)

Figure 6:
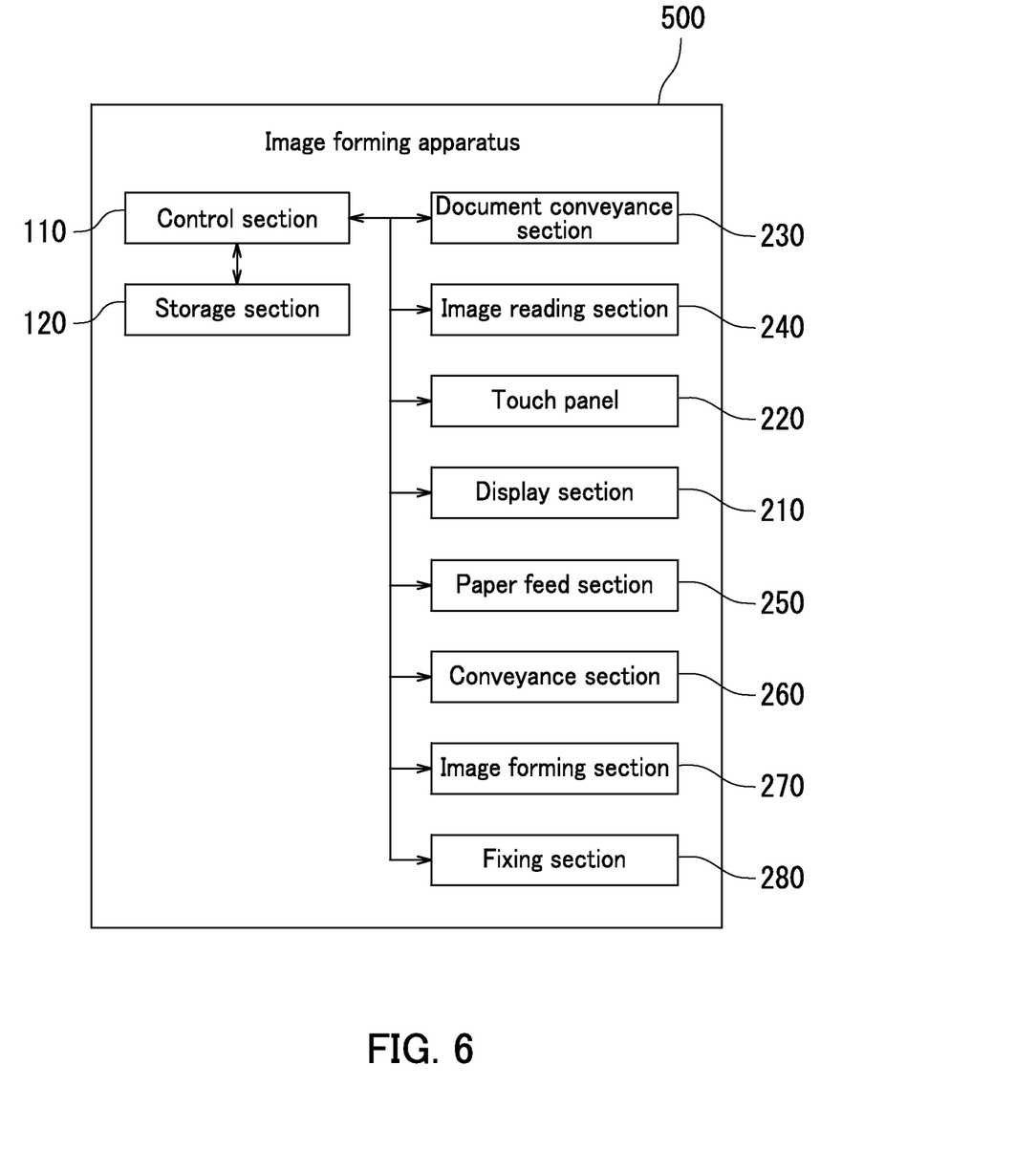
FIG. 6 is a block diagram illustrating an image forming apparatus according to a second embodiment of the present invention.

An image forming apparatus 500 according to a second embodiment of the present invention will be described with reference to FIGS. 1 and 6. FIG. 6 is a block diagram illustrating the image forming apparatus 500.

The image forming apparatus 500 includes a control section 110, a storage section 120, a document conveyance section 230, an image reading section 240, the touch panel 220, the display section 210, a paper feed section 250, a conveyance section 260, an image forming section 270, and a fixing section 280. The storage section 120 includes a main storage (e.g., a semiconductor memory) and an auxiliary storage (e.g., a semiconductor memory and/or a hard disk drive).

The control section 110 performs overall control on the image forming apparatus 500. Specifically, the control section 110 executes computer programs stored in the storage section 120 to control the document conveyance section 230, the image reading section 240, the touch panel 220, the display section 210, the paper feed section 250, the conveyance section 260, the image forming section 270, and the fixing section 280. The control section 110 may be a central processing unit (CPU), for example. The touch panel 220 is located on the display surface of the display section 210.

The control section 110 functions as the display control section 100 in the first embodiment. Accordingly, a combination of the control section 110, the display section 210, and the touch panel 220 constitutes the display device 10 according to the first embodiment. The storage section 120 stores image data of a plurality of pages P (e.g., an eBook 20 or a set of images).

The document conveyance section 230 conveys an original document to the image reading section 240. The image reading section 240 reads an image of the original document to generate image data. The paper feed section 250 includes a paper feed cassette and a manual feed tray. Paper is loaded on the paper feed cassette. The paper may be plain paper, recycled paper, thin paper, thick paper, an overhead projector (OHP) sheet, or the like.

The conveyance section 260 conveys the paper to the image forming section 270. The image forming section 270 forms an image of a page P selected from the plurality of pages P onto the paper. The control section 110 performs page selection according to a user instruction through the touch panel 220. The fixing section 280 fixes the image formed on the paper to the paper.

As described so far with reference to FIGS. 1, 5, and 6, the second embodiment includes the display device 10 that is the same as that described in the first embodiment with reference to FIGS. 1-5. Therefore, the second embodiment can achieve the same advantages as the first embodiment.

The first and second embodiments have been described with reference to FIGS. 1-6. It should be noted that the present invention is not limited to the above embodiments and various alterations can be made within the scope not departing from the essence of the present invention. The following alterations can be made, for example.

(1) Pages P are turned upon determination of a touch point moving in the first embodiment (see Step S11 in FIG. 4 and Step S21 in FIG. 5). However, the display control section 100 may perform page turning upon determination of a movement amount of a touch point being not less than a threshold value. This configuration can prevent page turning in response to movement of a touch point that the user does not intends.

(2) Pages P are turned upon the touch panel 220 detecting two touch points in the first embodiment. However, the number of touch points that the touch panel 220 is to detect is not limited to two and may be three or more. In the above configuration, the display control section 100 can perform page turning at a different page turning speed each time a different touch point is detected, for example. The page turning speed differs for each touch point.

(3) The page turning direction is opposite to a movement direction of a touch point in the first embodiment. However, the page turning direction may be the same direction as a movement direction of a touch point. For example, in a situation in which a movement direction of a touch point is the direction indicated by the arrow A10, the page turning direction may be the direction indicated by the arrow C2 Likewise, in a situation in which a movement direction of a touch point is the direction indicated by the arrow A12, the page turning direction may be the direction indicated by the arrow C1.

(4) The display control section 100 may perform page turning upon the touch panel 220 detecting movement of one touch point in the reading mode. Furthermore, a plurality of pages P (e.g., two pages P side by side) rather than one page P may be displayed in parallel to the display surface in the reading mode.

(5) The reading mode is set initially in the first embodiment. However, the search mode may be set initially.

INDUSTRIAL APPLICABILITY

The present invention is applicable to the fields of display devices that display a plurality of pages (e.g., an eBook or a set of images), and image forming apparatuses including such a display device.

The invention claimed is:

1. A display device comprising:
a display section configured to display an e-book containing a plurality of pages;
a detection section configured to detect first touch point and a second touch point different from the first touch point on a display surface of the display section; and
a display control section having a reading mode and a search mode, a page selected from among the plurality of pages contained in the e-book being displayed in the display section in parallel to the display surface of the display section in the reading mode, the plurality of pages being turned in response to movement of one of the first and second touch points in the search mode, wherein
the display control section changes mode from the reading mode to the search mode upon the detection section detecting the first and second touch points in the reading mode,
the display section displays a fore edge of the e-book in a closed and upright state in response to mode change from the reading mode to the search mode,
in the search mode, the display control section:
  sets a speed of page turning of the plurality of pages to a first page turning speed in response to movement of the first touch point,
  performs page turning at the first page turning speed, and
  suspends page turning in response to movement of the first touch point stopping, sets the speed of page turning to a second page tuning speed different from the first page turning speed before the first touch point stops in response to movement of the second touch point stopping,
  performs page turning at the second page turning speed, and
  suspends page turning in response to the movement of the second touch point,
the display control section selects a page opened at suspension of the page turning in response to movement of one of the first and second touch points stopping,
the display control section changes the mode from the search mode to the reading mode in response to the detection section detecting disappearance of the first and second touch points, and
the page turning speed is the number of pages turned per unit time,
in response to the movement of the second touch point different from the first touch point that stops, the display control section performs page turning in a direction different from a page turning direction in page turning before the first touch point stops,
the page turning direction is a direction toward an end page or a front page of the plurality of pages, and
the control section
  performs page turning of the plurality of pages in a direction toward an end page of the plurality of pages in response to movement of the first touch point, and
  performs page turning of the plurality of pages in a direction toward a front page of the plurality of pages in response to movement of the second touch point.

2. The display device according to claim 1, wherein the second page turning speed is lower than the first page turning speed in page turning before the first touch point stops.

3. The display device according to claim 1, wherein the display control section performs page turning upon determining a movement amount of the first touch point being not less than a threshold value, and the display control section performs page turning upon determining a movement amount of the second touch point being not less than a threshold value.

4. An image forming apparatus comprising:
the display device according to claim 1; and
an image forming section configured to form an image on paper of a page selected from the plurality of pages.

5. The display device according to claim 1, wherein in the search mode, the display section displays a turned page aslant relative to the display surface of the display section.

6. The display device according to claim 1, wherein in an initial state, the display control section is in the reading mode, and
in the reading mode in the initial state, the display section displays a front page of the e-book.

7. The display device according to claim 6, wherein in transition from the reading mode in the initial state to the search mode, the display section does not display information contained in the pages.

8. A display control method using a reading mode and a search mode, comprising:
displaying an e-book containing a plurality of pages;
detecting a first touch point and a second touch point on a display surface of a display section;
changing, upon detection of the first and second touch points in the reading mode, from the reading mode to the search mode;
displaying a fore edge of the e-book in a closed and upright state in response to mode change from the reading mode the search mode;

performing page turning of the plurality of pages in response to movement of one of the first and second touch points in the search mode;

in the search mode, setting a speed of page turning of the plurality of pages to a first page turning speed in response to movement of the first touch point, performing page turning of the plurality of pages at the first page turning speed, and suspending page turning in response to the movement of the first touch point stopping;

in the search mode, setting the page turning speed to a second page turning speed different form the first page turning speed before the first touch point stops in response to movement of the second touch point different from the first touch point that stops, performing page turning at the second page turning speed, and suspending the page turning in response to the movement of the second touch point stopping;

selecting a page opened at suspension of the page turning in response to movement of the first or second touch point stopping, changing mode from the search mode to the reading mode upon detection of disappearance of the first and second touch points;

displaying the page selected from among the plurality of pages contained in the e-book in parallel to the display surface in the reading mode, in response to the movement of the second touch point different from the first touch point that stops, performing page turning in a direction different from a page turning direction in page turning before the first touch point stops;

performing page turning of the plurality of pages in a direction toward an end page of the plurality of pages in response to movement of the first touch point; and performing page turning of the plurality of pages in a direction toward a front page of the plurality of pages in response to movement of the second touch point, wherein the page turning speed is the number of pages turned per unit time, and the page turning direction is a direction toward an end page or a front page of the plurality of pages.

* * * * *